(12) United States Patent
Kawabe et al.

(10) Patent No.: US 9,658,327 B2
(45) Date of Patent: May 23, 2017

(54) RADAR DEVICE AND METHOD OF PROCESSING SIGNAL

(71) Applicant: FUJITSU TEN LIMITED, Kobe-shi, Hyogo (JP)

(72) Inventors: Seiji Kawabe, Kobe (JP); Hisateru Asanuma, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 333 days.

(21) Appl. No.: 13/768,195

(22) Filed: Feb. 15, 2013

(65) Prior Publication Data
US 2013/0257642 A1 Oct. 3, 2013

(30) Foreign Application Priority Data

Mar. 29, 2012 (JP) ................................. 2012-075541

(51) Int. Cl.
*G01S 13/93* (2006.01)
*B60W 30/16* (2012.01)
(Continued)

(52) U.S. Cl.
CPC ........... *G01S 13/931* (2013.01); *B60W 30/16* (2013.01); *G01S 13/345* (2013.01); *G01S 13/42* (2013.01);
(Continued)

(58) Field of Classification Search
CPC .... G01S 13/345; G01S 13/931; G01S 13/726; B60W 30/16
(Continued)

(56) References Cited

U.S. PATENT DOCUMENTS 6,970,129 B2 * 11/2005 Kumon ................. G01S 13/345
342/109
7,911,374 B2 * 3/2011 Moriuchi ................ G01S 3/48
342/146
(Continued)

FOREIGN PATENT DOCUMENTS

JP    A-2000-206241    7/2000
JP    2002-341020 A    11/2002
(Continued)

OTHER PUBLICATIONS

Office Action issued in Chinese Application No. 201310060191.6 dated Aug. 19, 2014 (with partial translation).
(Continued)

*Primary Examiner* — Marcus Windrich
(74) *Attorney, Agent, or Firm* — Oliff PLC

(57) ABSTRACT

A radar device according to an embodiment includes a transmission unit, a reception unit, a processing unit, a first determination unit, and a second determination unit. The transmission unit emits transmission signals. The reception unit receives reception signals acquired by reflecting the transmission signals on an object. The processing unit detects object data corresponding to the object from the reception signals. The first determination unit determines object data included in a predicted range based on past object data detected in the past as past correspondence data having time continuity with respect to the past object data. In a case where parameters of new data that has not been detected in the past and the past correspondence data have predetermined relation, the second determination unit determines that the new data and the past correspondence data correspond to the same object.

13 Claims, 13 Drawing Sheets

(51) Int. Cl.
*G01S 13/34* (2006.01)
*G01S 13/42* (2006.01)
*G01S 13/58* (2006.01)
*G01S 13/72* (2006.01)

(52) U.S. Cl.
CPC .......... *G01S 13/584* (2013.01); *G01S 13/586* (2013.01); *G01S 13/726* (2013.01); *G01S 2013/935* (2013.01); *G01S 2013/9321* (2013.01); *G01S 2013/9325* (2013.01); *G01S 2013/9346* (2013.01); *G01S 2013/9353* (2013.01); *G01S 2013/9375* (2013.01); *G01S 2013/9378* (2013.01); *G01S 2013/9385* (2013.01)

(58) Field of Classification Search
USPC .......................................................... 342/70
See application file for complete search history.

(56) References Cited

U.S. PATENT DOCUMENTS

| | | | | |
|---|---|---|---|---|
| 8,674,873 B2* | 3/2014 | Shibata | ................ | G01S 13/345 342/118 |
| 8,847,815 B2* | 9/2014 | Kanamoto | ................ | G01S 3/74 342/118 |
| 2003/0085835 A1* | 5/2003 | Matsui | ................ | G01S 13/345 342/70 |
| 2003/0122702 A1* | 7/2003 | Kishida | ................ | G01S 13/345 342/70 |
| 2010/0225521 A1* | 9/2010 | Mochizuki | ............ | G01S 13/345 342/70 |
| 2011/0074622 A1* | 3/2011 | Shibata | ................ | G01S 13/345 342/90 |
| 2011/0205102 A1* | 8/2011 | Shibata | ................ | G01S 13/345 342/70 |
| 2013/0222176 A1* | 8/2013 | Ishimori | ............... | G01S 13/345 342/70 |

FOREIGN PATENT DOCUMENTS

| | | |
|---|---|---|
| JP | 2003-149337 A | 5/2003 |
| JP | 2003-167047 A | 6/2003 |

OTHER PUBLICATIONS

Feb. 9, 2016 Office Action issued in Japanese Patent Application No. 2012-075541.

English Machine Translation of JP2003-167047A, which was published Jun. 13, 2003.

English Machine Translation of JP2002-341020A, which was published Nov. 27, 2002.

* cited by examiner

RADAR DEVICE AND METHOD OF PROCESSING SIGNAL

CROSS-REFERENCE TO RELATED APPLICATION

This application is based upon and claims the benefit of priority of the prior Japanese Patent Application No. 2012-075541, filed on Mar. 29, 2012, the entire contents of which are incorporated herein by reference.

BACKGROUND OF THE INVENTION

1. Field of the Invention

Disclosed embodiments relate to a radar device and a method of processing a signal.

2. Description of the Related Art

Conventionally, there is a case where the following vehicle control is performed for a vehicle (hereinafter, referred to as a "front vehicle") traveling on the front side of a vehicle (hereinafter, simply referred to as a "vehicle") in which a radar device is installed. For example, there is a case where the vehicle travels with the front vehicle being set as a tracking target under the control of ACC (Adaptive Cruise Control). During performing such control, there is a case where the detection of object data of the front vehicle using the radar device is not sufficient, for example, when the vehicle travels inside a tunnel. Described in more detail, there is a case where the detection of object data corresponding to the front vehicle is not sufficient when an object (hereinafter, referred to as a "stationary object") having a relative speed corresponding to the speed of the vehicle such as a wall disposed inside a tunnel or a guard rail is present.

Here, a process of detecting object data of the front vehicle and the stationary object will be described as below. The radar device emits a transmission wave and receives a plurality of reflected waves arrived in accordance with the reflection of the transmission wave on the stationary object and the front vehicle as a reception signal. Then, a signal processing unit of the radar device performs an FFT (Fast Fourier Transform) process based on the received signal, whereby a plurality of transformed signals are generated. Next, the signal processing unit derives peak signals exceeding a predetermined threshold out of the plurality of transformed signals, whereby a peak signal corresponding to the stationary object and a peak signal corresponding to the front vehicle are derived.

There are many stationary objects due to the periphery of the vehicle being surrounded by the walls of a tunnel inside the tunnel, and there is the influence of multipath and the like, whereby many reflected waves are received by the radar device. Accordingly, in a case where a distance between the front vehicle and a stationary object is short, in other words, in a case where a vertical distance, which is a distance corresponding to the traveling direction of the vehicle, between the front vehicle and a stationary object is relatively short, the frequency of a peak signal corresponding to the front vehicle and the frequency of a peak signal corresponding to the stationary object are frequencies that are relatively close to each other. As a result, although the peak signal corresponding to the front vehicle and the peak signal corresponding to the stationary object are originally to be separately present, the peak signal corresponding to the front vehicle is included in many peak signals corresponding to the stationary objects. In other words, the peak signal corresponding to the front vehicle according to the radar device is buried in many peak signals corresponding to the stationary objects, and there is a case where object data corresponding to the front vehicle may not be accurately detected.

Accordingly, for example, in a case where a signal processing mode of an FM-CW (Frequency Modulated Continuous Wave) is used as a signal processing mode of detection of object data in a radar device, by expanding a frequency modulation width (hereinafter, simply referred to as a "frequency modulation width") of an UP zone and a DOWN zone corresponding to the transmission wave and the reception wave, the frequency resolution of the frequency of a peak signal derived after the FFT process can be improved. As a result, the resolution of the vertical distance of an object can be improved. Accordingly, by expanding the frequency modulation width, a peak signal corresponding to the front vehicle and a peak signal corresponding to a stationary object, which are frequencies relatively close to each other, can be separately derived.

More specifically, for example, in a case where the center frequency of the transmission signal is 76.5 GHz, in contrast to a conventional case where a frequency modulation width (the upper limit frequency is 76.6 GHz, and the lower limit frequency is 76.4 GHz) of 200 MHZ is used, for example, by expanding the frequency modulation width to 400 MHz (the upper limit frequency is 76.7 GHz, and the lower limit frequency is 76.3 GHz), the frequency resolution of the peak signal is improved, and peak signals corresponding to the front vehicle and another object that is a stationary object can be separately derived. As a material describing a technology according to this application, there is JP 2000-206241 A.

However, by expanding the frequency modulation width in this manner, another phenomenon that does not conventionally occur in an object data detecting process occurs. In other words, conventionally, even when a plurality of reflected waves reflected from the same object are received by a radar device, the distance of the reflected waves is a relatively short distance due to the reflection from the same object, and the peak signals after the FFT process have an approximately same frequency value, whereby one peak signal corresponding to the plurality of reflected waves is derived. In contrast to this, by expanding the frequency modulation width as described above, a plurality of peak signals corresponding to the plurality of reflected waves reflected from the same object are derived to have frequencies different from each other.

More specifically, for example, before the frequency modulation width is expanded, although a reception signal that is based on a reflected wave reflected from a rear bumper located on the rear side of the front vehicle and a reception signal that is based on a reflected wave reflected from a rear glass of the front vehicle that is close to the rear bumper in the vertical distance have a distance difference more or less, the reception signals are derived as one peak signal. However, by expanding the frequency modulation width, for example, one peak signal that is based on a reflected wave reflected from the rear bumper of the front vehicle and another peak signal that is based on a reflected wave reflected from the rear glass of the front vehicle are derived to have mutually different frequencies.

Here, the signal processing unit of the radar device performs a continuity determining process in which, from among a plurality of pieces of object data detected in one scanning, object data detected in this scanning within a predicted range that is based on object data (hereinafter, referred to as "past object data") detected in the past scanning is determined as object data (hereinafter, referred to as "past correspondence data") having time continuity with the past object data. In addition, from among a plurality of pieces of object data detected in this scanning, object data that has not been detected in the past scanning is determined as object data (hereinafter, referred to as "new data") that is newly detected. Here, being within the prediction range that is based on the object data detected in the past scanning represents a case where pair data acquired by paring a peak signal of the UP zone and a peak signal of the DOWN zone is included within a range of predetermined values of all the parameters of the vertical distance, the relative speed, and the horizontal distance, which is a distance in the vehicle width direction with the position of the vehicle being set as the origin.

Within the new data detected in one scanning, there is object data (hereinafter, referred to as "same object data") that corresponds to the same object as the object relating to the past correspondence data. For example, in a case where the object data of the rear bumper of the front vehicle is determined as past correspondence data, and the object data of the rear glass is determined as new data, the new data corresponding to the object data of the rear glass is the same object data.

In addition, there is a case where there is time continuity between the same object data and object data corresponding to another object in consecutively performing a plurality of scans. For example, in a case where there is object data corresponding to a vehicle (hereinafter, referred to as an "adjacent vehicle") traveling toward the front side of the vehicle in a lane (hereinafter, referred to as an "adjacent lane") that is adjacent to another lane in which the vehicle travels, when the vertical distance and the horizontal distance between the adjacent vehicle and the front vehicle are relatively short distances, there is a case where new data, which is the same object data, is determined as object data having time continuity with past object data corresponding to the adjacent vehicle. As a result, for example, in a case where the adjacent vehicle is present at a vertical distance shorter than that of the front vehicle from the vehicle, the tracking target may change from the front vehicle to the adjacent vehicle in the ACC control of the vehicle. Accordingly, there is a case where an object other than the object that is originally to be the tracking target is set as the tracking target, and there is a case in which safe vehicle control may not be provided to a user using the vehicle.

SUMMARY OF THE INVENTION

A radar device according to an embodiment includes a transmission unit, a reception unit, a processing unit, a first determination unit, and a second determination unit. The transmission unit emits transmission signals. The reception unit receives reception signals acquired by reflecting the transmission signals on an object. The processing unit detects object data corresponding to the object from the reception signals. The first determination unit determines object data included in a predicted range based on past object data detected in the past as past correspondence data having time continuity with respect to the past object data. In a case where parameters of new data that has not been detected in the past and the past correspondence data have predetermined relation, the second determination unit determines that the new data and the past correspondence data correspond to the same object.

BRIEF DESCRIPTION OF THE DRAWINGS

Complete understanding of the present invention and advantages thereof will be easily acquired by reading detailed description of the invention presented as below with reference to the accompanying drawings.

DETAILED DESCRIPTION OF THE PREFERRED EMBODIMENTS

Hereinafter, embodiments of the present invention will be described with reference to the drawings. The embodiments presented below are examples, and the technical scope of the invention of the present application is not limited thereto.

First Embodiment

1. Block Diagram

Figure 1:
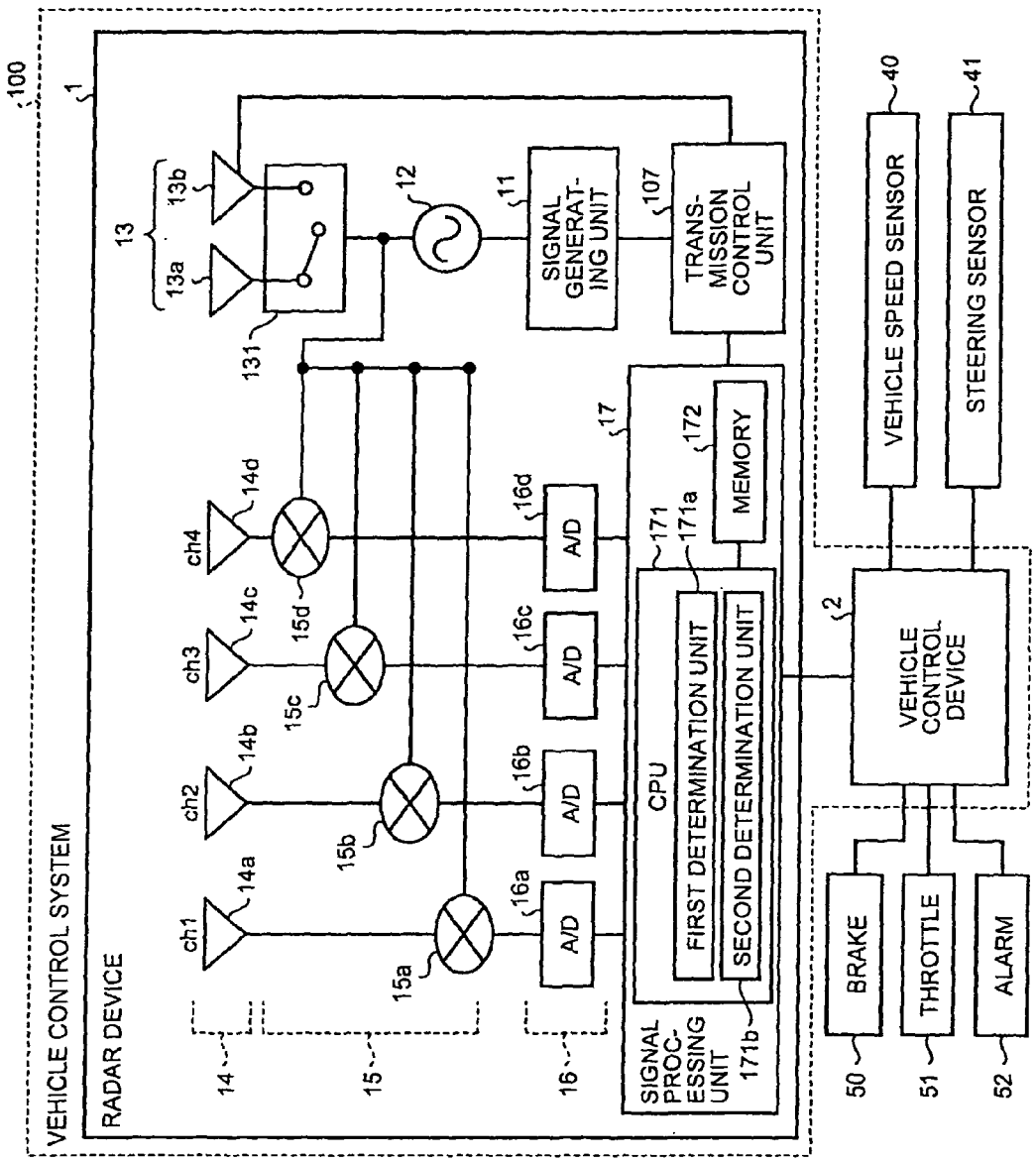
FIG. 1 is a block diagram of a vehicle control system according to a first embodiment.

FIG. 1 is a block diagram of a vehicle control system 100 according to a first embodiment. The vehicle control system 100 mainly includes a radar device 1 and a vehicle control device 2. The radar device 1 is disposed in a front portion of the front side of a vehicle, scans a predetermined scanning range by one scan, derives a vertical distance between a vehicle including the radar device 1 and an object and a relative speed thereof, and derives a horizontal distance that corresponds to the angle of the object viewed from the vehicle. In addition, the mounting position of the radar device 1 is not limited to the front portion of the front side of the vehicle but may be any one of the rear side or the lateral side of the vehicle.

The vehicle control device 2 is a device disposed inside the vehicle and is an ECU (Electronic Control Unit) that controls each device of the vehicle.

The radar device 1 detects object data corresponding to an object such as another vehicle that is present on the periphery of the vehicle in which the radar device 1 is mounted. Described in more detail, the radar device emits a transmission wave relating to a frequency-modulated transmission signal, in which the transmission wave receives a reflected wave that comes by being reflected on an object as a reception signal, and detects object data corresponding to the object from the reception signal. Then, the vehicle control device 2 outputs control signals used for the operation of a brake 50, the adjustment of the degree of openness of a throttle 51, and alarming a warning sound to a user using the vehicle using an alarm 52, which will be described later, to each unit of the vehicle based on the object data.

The radar device 1 mainly includes a signal generating unit 11, an oscillator 12, a transmission antenna 13, a reception antenna 14, a mixer 15, an AD (Analog to Digital) converter 16, and a signal processing unit 17.

The signal generating unit 11 generates a modulation signal of which the voltage changes, for example, in the shape of chopping waves based on an instruction signal transmitted from a transmission control unit 107 to be described later.

The oscillator 12 is a voltage controlled oscillator that controls the oscillation frequency by using a voltage, performs frequency modulation of a signal (for example, a signal of a frequency band having 76.5 GHz as the center frequency) of a predetermined frequency band based on a modulation signal generated by the signal generating unit 11, and outputs a resultant signal to the transmission antenna 13 as a transmission signal.

The transmission antenna 13 outputs a transmission wave relating to the transmission signal to the outside of the vehicle. The radar device 1 according to this embodiment includes two transmission antennas including transmission antennas 13a and 13b. Switching between the transmission antennas 13a and 13b is performed in accordance with the switching of a switching unit 131 at a predetermined period, and a transmission wave is continuously output to the outside of the vehicle from the transmission antenna 13 that is connected to the oscillator 12.

The switching unit 131 is a switch that switches between connections of the oscillator 12 and the transmission antennas 13 and connects one of the transmission antennas 13a and 13b to the oscillator 12 in accordance with a signal transmitted from the transmission control unit 107.

The reception antenna 14 is formed by a plurality of antennas receiving reflected waves acquired by reflecting the transmission wave that is continuously transmitted from the transmission antennas 13 on objects. In this embodiment, the reception antenna 14 is configured by four reception antennas including reception antennas 14a (ch1), 14b (ch2), 14c (ch3), and 14d (ch4). The reception antennas 14a to 14d are arranged so as to be equally spaced.

The mixer 15 is arranged in each reception antenna. The mixer 15 mixes the reception signal and the transmission signal. Then, a signal (hereinafter, referred to as a "beat signal") of a frequency (hereinafter, referred to as a "beat frequency") of a difference between the transmission signal and the reception signal is generated by mixing the reception signal and the transmission signal, and the beat signal is output to the AD converter 16.

The AD converter 16 performs sampling of the beat signal, which is an analog signal, at a predetermined period, thereby deriving a plurality of pieces of sampling data. Then, by quantizing the sampled data, the beat signal of analog data is converted into digital data, and the digital data is output to the signal processing unit 17. Similarly to the mixer 15, the AD converter 16 is disposed in each reception antenna.

The signal processing unit 17 is a computer that includes a CPU 171 and a memory 172 and derives a vertical distance, a relative speed, and a horizontal distance of object data corresponding to an object based on the beat signal output from the AD converter 16. The CPU 171 includes a first determination unit 171a and a second determination unit 171b.

In addition, the signal processing unit 17 detects past correspondence data that has time continuity with past object data detected in a past scan from among a plurality of pieces of pair data detected in a continuity determining process by one scan. Then, in a case where values of a plurality of parameters of new data which is object data that has not been detected in a past scan, and values of a plurality of parameters of the past correspondence data have predetermined relation, the signal processing unit 17 determines that the new data as a target is same object data that is object data corresponding to the same object as an object relating to the past correspondence data.

While a plurality of pieces of object data including information of new data is recorded in the memory 172 to be described later, new data that has been determined to be the same object data, which has been recorded, is removed from the memory 172. The same object data determining process and the same object data removing process will be described later in detail.

The CPU 171 performs various calculation processes based on various programs recorded in the memory 172. For example, the CPU 171 performs the same object data determining process described above.

In the memory 172, execution programs of various calculation processes and the like performed by the CPU are recorded. For example, a program used for the same object data determining process described above is recorded in the memory 172. In addition, in the memory 172, information of a plurality of pieces of object data detected by the signal processing unit 17 is stored. More specifically, for example, values of a vertical distance, a relative speed, and a horizontal distance, which are values of a plurality of parameters of object data detected in a past scan and this scan, are stored in the memory 172.

The vehicle control device 2 controls the operations of various devices of the vehicle. In other words, the vehicle control device 2 acquires information from various sensors such as a vehicle speed sensor 40 and a steering sensor 41. Then, the vehicle control device 2 controls the behavior of the vehicle by operating various devices such as a brake 50, a throttle 51, and an alarm 52 based on the information acquired from various sensors and the object data acquired from the signal processing unit 17 of the radar device 1.

An example of vehicle control using the vehicle control device 2 is as follows. A vehicle travels with a front vehicle set as a tracking target, and the vehicle is allowed to travel so as to track the front vehicle with a predetermined inter-vehicle distance being secured between the vehicle and the front vehicle by controlling at least one device of the brake 50 and the throttle 51 during traveling. As an example of such control, there is ACC (Adaptive Cruise Control).

In addition, another example of vehicle control using the vehicle control device 2 is as follows. In a case where there is collision risk, a warning is displayed by controlling the alarm 52, and the speed of the traveling vehicle is decreased by controlling the brake 50. In addition, at the time of a collision, the vehicle control device 2 performs control for preparing for a shock by fixing a passenger to the seat using a safety belt or reducing a damage occurring to the body of a passenger by fixing the headrest. As an example of such control, there is a PCS (Pre-Crash Safety System). Hereinafter, the description will be continued on the premise of the control of ACC in which control of the vehicle is performed with the front vehicle set as a tracking target.

The vehicle speed sensor 40 outputs a signal according to the speed of the vehicle based on the number of revolutions of the vehicle shaft of the vehicle. The vehicle control device 2 acquires a vehicle speed at the current time point based on the signal supplied from the vehicle speed sensor 40.

The steering sensor 41 detects a rotation angle of the steering wheel according to the operation of a driver of the vehicle 1 and transmits angle information of the vehicle to the vehicle control device 2.

The brake 50 reduces the speed of the vehicle in accordance with an operation of a driver of the vehicle. In addition, the brake 50 reduces the speed of the vehicle under the control of the vehicle control device 2. For example, the speed of the vehicle is reduced such that a distance between the vehicle and the front vehicle is maintained at a constant distance.

The throttle 51 increases the speed of the vehicle in accordance with the operation of a driver of the vehicle. In addition, the throttle 51 increases the speed of the vehicle under the control of the vehicle control device 2. For example, the throttle 51 increases the speed of the vehicle such that a distance between the vehicle and the front vehicle is maintained at a predetermined distance.

The alarm 52 operates in accordance with a signal supplied from the vehicle control device 2. For example, in a case where there is a possibility of the occurrence of a collision between the vehicle and the front vehicle, the alarm 52 outputs a warning sound to a driver of the vehicle for the preparation of the collision.

2. Signal Processing of FM-CW

Next, an object data detecting process of the radar device 1 will be described based on the FM-CW as an example of the signal processing mode. In the description of the process, the process in the case of two types of modulation widths (for example, 200 MHz and 400 MHz) having mutually-different frequency modulation widths of FM will be described. In this embodiment, although the FM-CW mode will be described, the mode is not limited to the FM-CW mode as long as a mode is employed in which object data is detected by combining a plurality of zones such as an UP zone, in which the frequency of the transmission signal increases, and a DOWN zone, in which the frequency of the transmission signal decreases.

Figure 2:
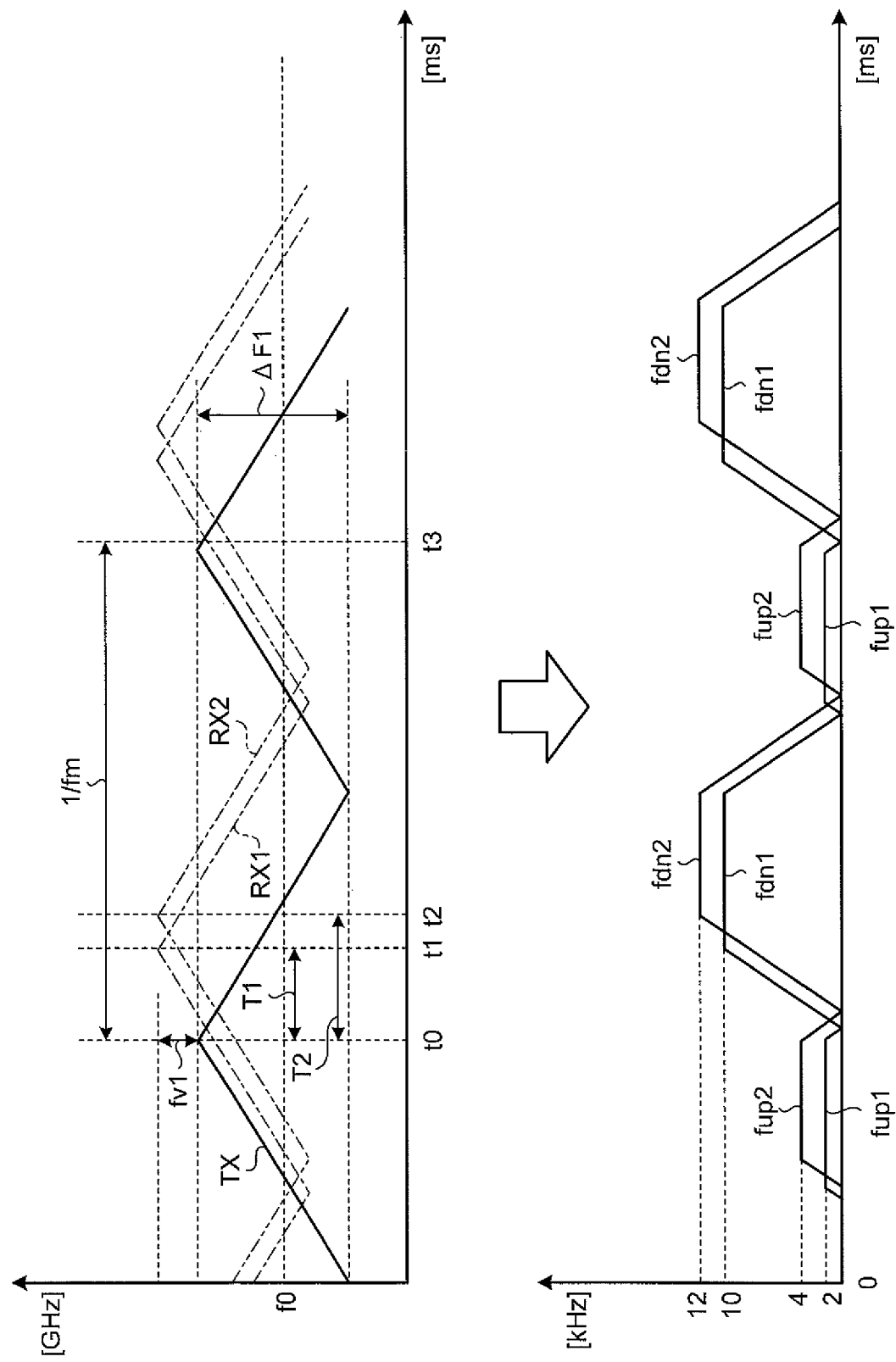
FIG. 2 is a diagram that mainly illustrates a transmission signal and reception signals according to the first embodiment.
Figure 4:
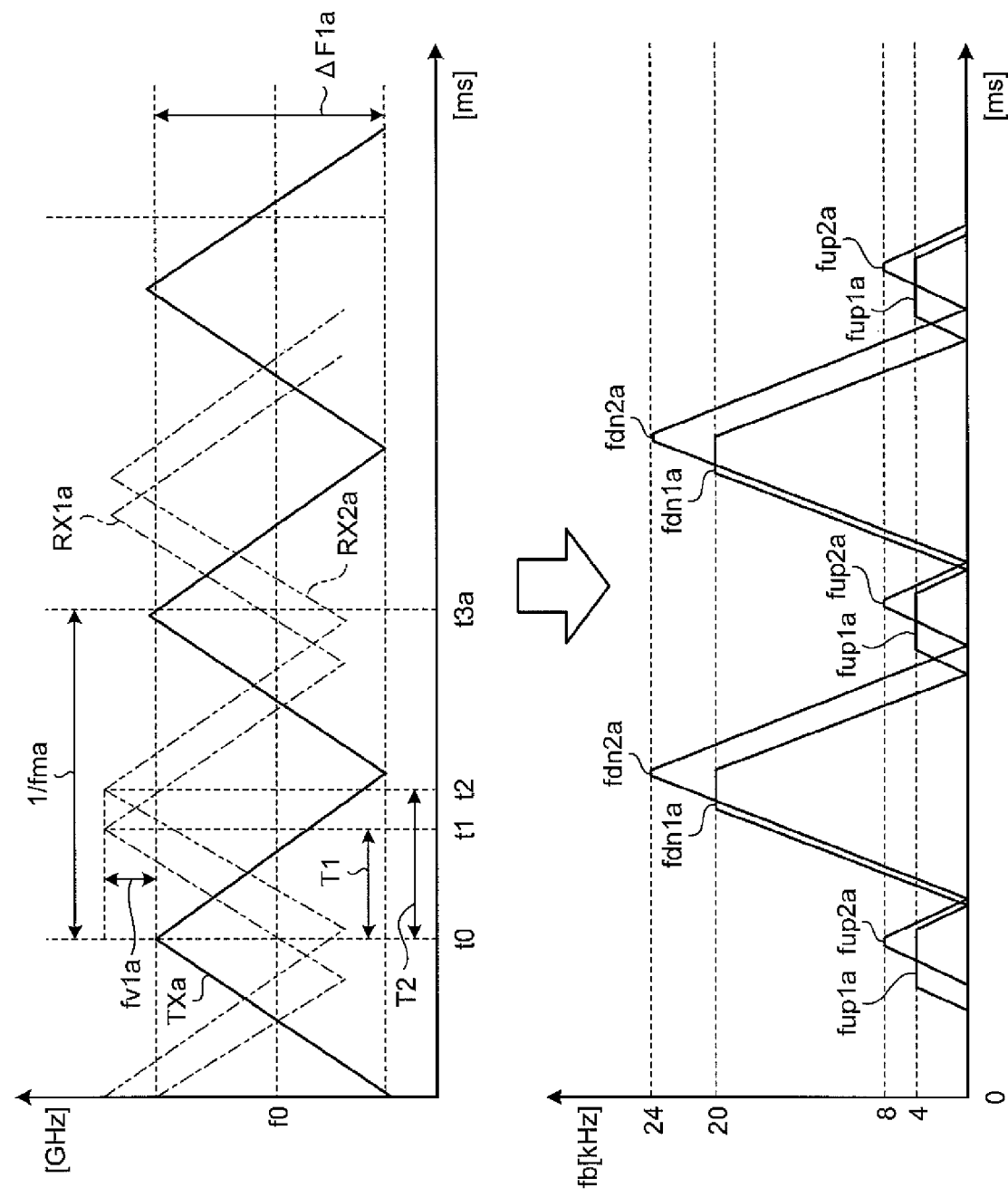
FIG. 4 is a diagram that mainly illustrates a transmission signal and reception signals according to the first embodiment.

Numerical expressions illustrated below and symbols of FM-CW signals and the beat frequencies illustrated in FIGS. 2 and 4 represent the followings.

fup: beat frequency of UP zone
fdn: beat frequency of DOWN zone
fr: distance frequency
fv: speed frequency
fo: center frequency of transmission wave
$\Delta F1$, $\Delta F1a$: frequency modulation width
fma, fmb: repetition frequency of modulated wave
c: speed of light (speed of radio waves)
$\theta m$: angle of object data
$\theta up$: angle that is based on peak signal of UP zone
$\theta dn$: angle that is based on peak signal of DOWN zone 2-1. Case where Frequency Modulation Width is First Modulation Width (for Example, 200 MHz)

First, signal processing of a case where the modulation width of a transmission signal and a reception signal in the FM-CW is a first modulation width (for example, 200 MHz), which is relatively narrow, will be described with reference to FIGS. 2 and 3. FIG. 2 is a diagram that mainly illustrates a transmission signal TX and reception signals RX1 and RX2 according to the first embodiment.

In an upper diagram of FIG. 2, the horizontal axis represents the time (ms), and the vertical axis represents the frequency (GHz). In the figure, the transmission signal TX denoted by a solid line has a property of changing the frequency at a predetermined period (a period of 1/fm between time t0 to t3), and there are UP zones in which the frequency increases and DOWN zones in which the frequency decreases up to a predetermined frequency after an increase up to a predetermined frequency. The transmission signal TX is a signal, for example, having a frequency modulation width $\Delta F1$ of 200 MHz, and, in a case where the center frequency is 76.5 GHz, repeats a periodical constant change in which the frequency increases up to an upper limit frequency of 76.6 GHz and then decreases up to a lower limit frequency of 76.4 GHz.

The reception signal RX1 and the reception signal RX2 are reflected waves coming by reflecting the transmission wave output from the transmission antenna 13 on an object, such a plurality of reflected waves are received by the reception antenna 14, and the reception signal RX1 denoted by a one-dot chain line and the reception signal RX2 denoted by a two-dot chain line, which are illustrated in the upper diagram of FIG. 2, are formed. Here, the reception signals RX1 and RX2 are signals based on reflected waves reflected from mutually-different reflecting points of the same object, and, for example, the reception signal RX1 is based on a reflected wave reflected from the rear bumper of the front vehicle, and the reception signal RX2 is based on a reflected wave reflected from the rear glass of the front vehicle. In addition, the frequency modulation width and the signal period of the reception signals RX1 and RX2 are the same as those of the transmission signal TX, and, similarly to the transmission signal TX, there are UP zones and DOWN zones in the reception signals.

Thus, a vertical distance between the vehicle and the rear bumper of the front vehicle corresponds to a time delay between the transmission signal TX and the reception signal RX1. More particularly, for example, a time interval T1 between time t0 and time t1 corresponds to a vertical distance between the vehicle and the rear bumper of the front vehicle. In addition, a vertical distance between the vehicle and the rear glass of the front vehicle corresponds to a time delay between the transmission signal TX and the reception signal RX2. More particularly, for example, a time interval T2 between time t0 to time t2 corresponds to a vertical distance between the vehicle and the rear glass of the front vehicle. In addition, a frequency corresponding to the time intervals T1 and T2 is a distance frequency fr.

In a case where there is a speed difference between the vehicle and the front vehicle, as illustrated in FIG. 2, the reception signals RX1 and RX2 are shifted with respect to the transmission signal TX in parallel with the frequency direction (the direction of the vertical axis). A frequency corresponding to such a Doppler shift is a speed frequency fv1. Here, since the reception signals RX1 and RX2 are signals based on reflecting points (reflecting points from the rear bumper and the rear glass) of the same object, relative speeds of the reflecting points with respect to the vehicle have an approximately same value. For this reason, the speed frequencies of the reception signals RX1 and RX2 have an approximately same value that is the speed frequency fv1.

In a lower diagram of FIG. 2, the horizontal axis is the time (ms), and the vertical axis is the frequency (KHz), and the diagram illustrates a differential frequency between the transmission signal and the reception signal in the UP zone and a differential frequency between the transmission signal and the reception signal in the DOWN zone.

In other words, as illustrated in the lower diagram of FIG. 2, a beat frequency corresponding to the reception signal RX1 in the UP zone is beat frequency fup1 (for example, 2 kHz), and a beat frequency corresponding to the reception signal RX2 in the UP zone is beat frequency fup2 (for example, 4 kHz). In addition, a beat frequency corresponding to the reception signal RX1 in the DOWN zone is beat frequency fdn1 (for example, 10 kHz), and a beat frequency corresponding to the reception signal RX2 in the DOWN zone is beat frequency fdn2 (for example, 12 kHz).

Next, signals of the beat frequencies for the UP zone and the DOWN zone are output to the AD converter 16. Then, the signal processing unit 17 performs an FFT process for the beat signals that have been processed by the AD converter 16 from analog signals to digital signals, thereby deriving transformed signals as illustrated in FIG. 3.

Figure 3:
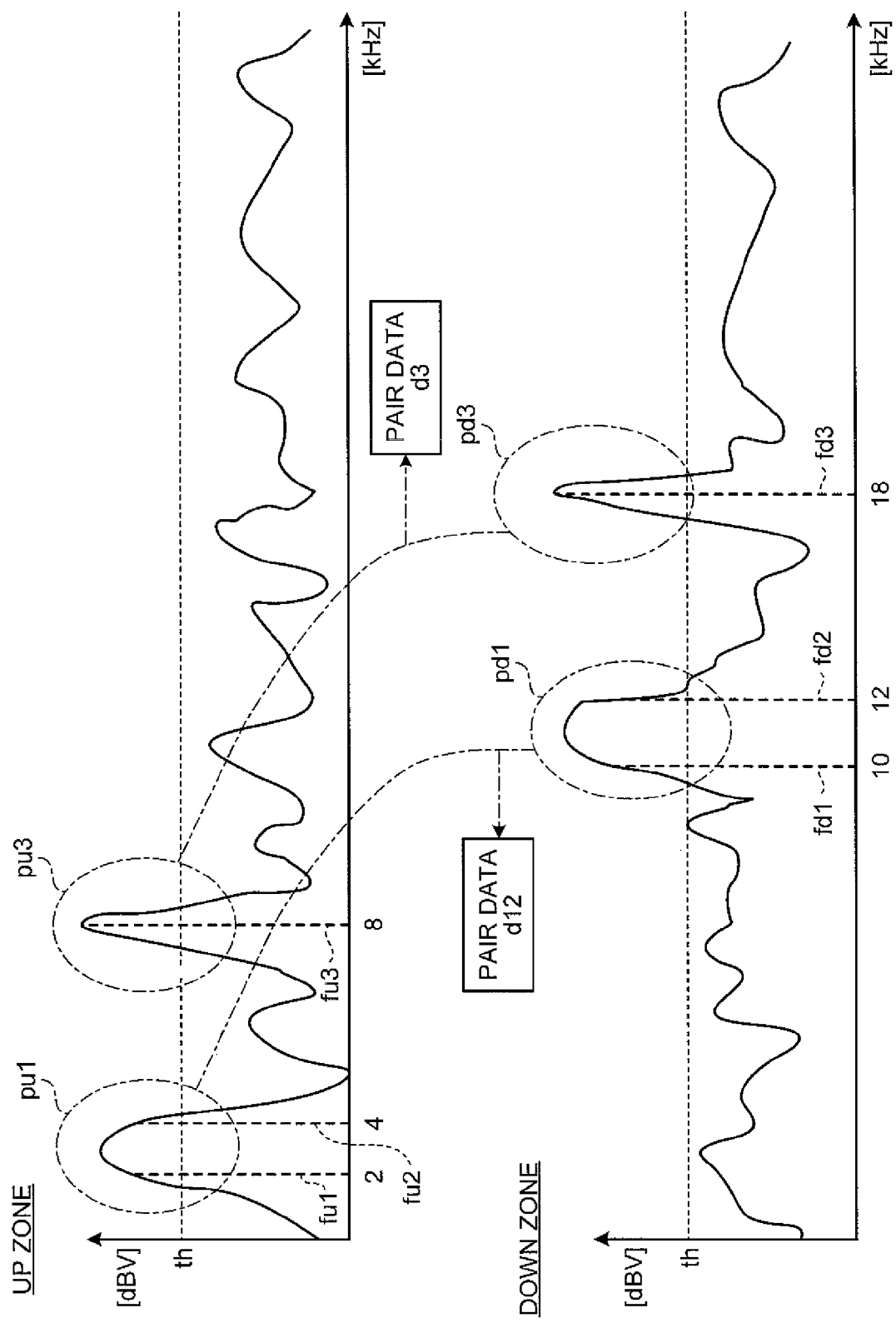
FIG. 3 is a diagram that illustrates transformed signals derived by an FFT process according to the first embodiment.

FIG. 3 is a diagram that illustrates transformed signals derived by an FFT process according to the first embodiment. In graphs illustrated in an upper diagram of FIG. 3 and a lower diagram of FIG. 3, the horizontal axis is the frequency [kHz], and the vertical axis is the signal level [dBV]. Here, the upper diagram of FIG. 3 is a diagram that illustrates transformed signals according to the FFT process in the UP zone. The transformed signals fu1, fu2, and fu3 illustrated in the upper diagram of FIG. 3 are signals exceeding a threshold th representing a predetermined signal level and are derived as peak signals. In addition, the transformed signals fu1 and fu2 are signals corresponding to the beat frequencies fup1 and fup2 described with reference to the lower diagram of FIG. 2, and the transformed signal fu3 is a signal corresponding to a beat frequency not illustrated in the lower diagram of FIG. 2. In other words, the transformed signal fu3 is a signal based on a reflected wave reflected from an object that corresponds to an object (for example, an adjacent vehicle) other than the front vehicle.

Since the transformed signals fu1 and fu2 are located at frequencies that are relatively close to each other, the two transformed signals are derived as one peak signal pu1, and the transformed signal fu3 is derived as another peak signal pu3.

In addition, the lower diagram of FIG. 3 is a diagram that illustrates transformed signals according to the FFT process in the DOWN zone. The transformed signals fd1, fd2, and fd3 illustrated in the lower diagram of FIG. 3 are signals exceeding a threshold th representing a predetermined signal level and are derived as peak signals. In addition, the transformed signals fd1 and fd2 are signals corresponding to the beat frequencies fdn1 and fdn2 described with reference to the lower diagram of FIG. 2, and the transformed signal fd3 is a signal corresponding to a beat frequency not illustrated in the lower diagram of FIG. 2. In other words, the transformed signal fd3 is a signal based on a reflected wave reflected from an object that corresponds to an object (for example, an adjacent vehicle) other than the front vehicle.

Then, the peak signal pu1 in the UP zone and the peak signal pd1 in the DOWN zone, and the peak signal pu3 in the UP zone and the peak signal pd3 in the DOWN zone are respectively paired, whereby pair data d12 and pair data d3 are derived. Based on such pair data, information such as a vertical distance and a relative speed of object data corresponding to an object is detected. In other words, information such as vertical distances and relative speeds of the front vehicle and the adjacent vehicle is detected.

A distance of an object from the vehicle is derived using Equation (1), and a relative speed of an object with respect to the vehicle is derived using Equation (2). In addition, an angle θup corresponding to the peak signal in the UP zone and an angle θdn corresponding to the peak signal in the DOWN zone are derived by an object angle deriving process to be described below, and the angle of the object is derived by using the angle information (the angle θup and the angle θdn) based on Equation (3). Then, a horizontal distance of the object data is derived using a trigonometric function from the information of the angle derived using Equation (3), the vertical distance of the object, and the like.

$$R = \frac{(f_{up} + f_{dn}) \cdot c}{2 \times (4 \times \Delta F \times f_m)} \qquad \text{Equation (1)}$$

$$V = \frac{(f_{up} - f_{dn}) \cdot c}{2 \times (4 \times \Delta F \times f_m)} \qquad \text{Equation (2)}$$

$$\theta m = \frac{\theta_{up} + \theta_{dn}}{2} \qquad \text{Equation (3)}$$

In this way, for example, in a case where the frequency modulation width is relatively narrow (for example, 200 MHz), the frequencies of transformed signals based on different reflecting points of the same object of the rear bumper of the front vehicle and the rear glass of the front vehicle are frequencies (for example, 2 kHz and 4 kHz) that are relatively close to each other. For that reason, the transformed signals are derived not as a plurality of peak signals but as one peak signal.

2-2. Case where Frequency Modulation Width is Second Modulation Width (for Example, 400 MHz)

Next, signal processing of a case where the modulation width of a transmission signal and a reception signal in the FM-CW is a second modulation width (for example, 400 MHz), which is relatively wide, will be described with reference to FIGS. 4 and 5. In the content described with reference to FIGS. 4 and 5, a point that is mainly different from the content described with reference to FIGS. 2 and 3 relates to a change in the frequency modulation width of the transmission signal and the reception signal and parts accompanied with the change in the frequency modulation width, and the other points are approximately the same as those of the content of the description presented in "2-1", and a part of which the description is redundant will not be described.

FIG. 4 is a diagram that mainly illustrates a transmission signal TXa and reception signals RX1a and RX2a according to the first embodiment. The transmission signal TXa illustrated in the upper diagram of FIG. 4 has a property of changing the frequency at a period (a period of 1/fma between time t0 and time t3a) shorter than the period (the period of 1/fm) of the transmission signal TX illustrated in the upper diagram of FIG. 2. The transmission signal TXa is a signal, for example, having a frequency modulation width ΔF1a of 400 MHz, and, in a case where the center frequency is 76.5 GHz, repeats a periodical constant change in which the frequency increases up to an upper limit frequency of 76.7 GHz and then decreases up to a lower limit frequency of 76.3 GHz.

The reception signals RX1$a$ and RX2$a$ are signals based on reflected waves reflected from mutually-different reflecting points of the same object, and, for example, the reception signal RX1$a$ is based on a reflected wave reflected from the rear bumper of the front vehicle, and the reception signal RX2$a$ is based on a reflected wave reflected from the rear glass of the front vehicle. In addition, the frequency modulation width and the signal period of the reception signals RX1$a$ and RX2$a$ are the same as those of the transmission signal TX$a$.

Since the frequency modulation width $\Delta F1a$ is expanded from 200 MHz to 400 MHz, the speed frequency fv1$a$ illustrated in the upper diagram of FIG. 4 has a value (for example, an approximately double value) that is larger than the speed frequency fv1 illustrated in the upper diagram of in FIG. 2. In addition, time intervals T1 and T2 illustrated in the upper diagram of FIG. 4 are intervals similar to the time intervals T1 and T2 illustrated in the upper diagram of FIG. 2.

A beat frequency illustrated in the lower diagram of FIG. 4 has a value (for example, an approximately double value) larger than the beat frequency illustrated in the lower diagram of FIG. 2 in accordance with the value of the speed frequency fv1$a$. In other words, a beat frequency corresponding to the reception signal RX1$a$ in the UP zone is beat frequency fup1$a$ (for example, 4 kHz), and a beat frequency corresponding to the reception signal RX2$a$ in the UP zone is beat frequency fup2$a$ (for example, 8 kHz). In addition, a beat frequency corresponding to the reception signal RX1$a$ in the DOWN zone is beat frequency fdn1$a$ (for example, 20 kHz), and a beat frequency corresponding to the reception signal RX2 in the DOWN zone is beat frequency fdn2$a$ (for example, 24 kHz).

Figure 5:
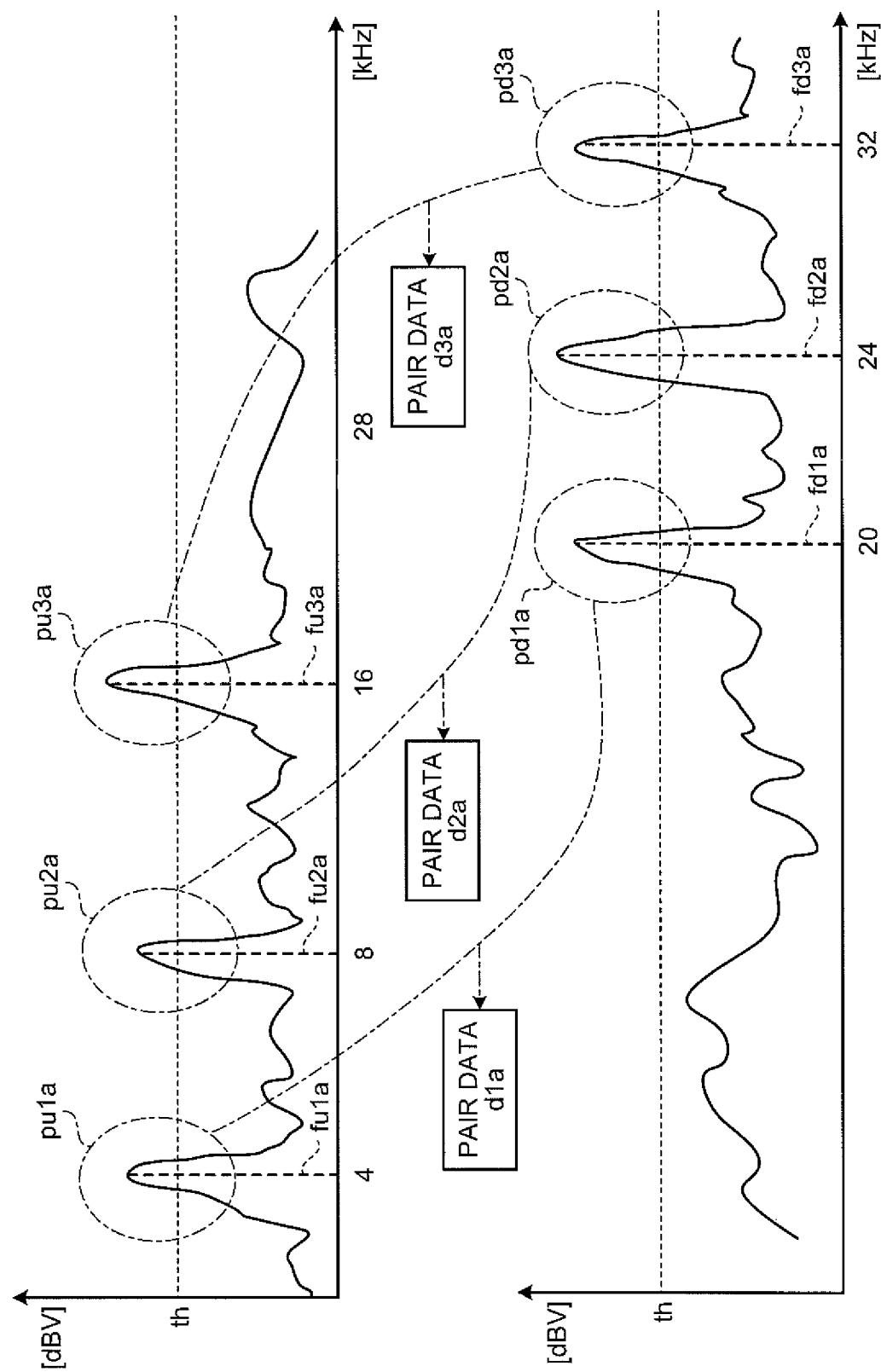
FIG. 5 is a diagram that illustrates a transformed signal derived by an FFT process according to the first embodiment.

FIG. 5 is a diagram that illustrates transformed signals derived by the FFT process according to the first embodiment. The transformed signals fu1$a$, fu2$a$, and fu3$a$ illustrated in the upper diagram of FIG. 5 are signals exceeding a threshold th representing a predetermined signal level and are derived as peak signals. In addition, the transformed signals fu1$a$ and fu2$a$ are signals corresponding to the beat frequencies fup1$a$ and fup2$a$ described with reference to the lower diagram of FIG. 4, and the transformed signal fu3$a$ is a signal corresponding to a beat frequency not illustrated in the lower diagram of FIG. 4. In other words, the transformed signal fu3$a$ is a signal based on a reflected wave reflected from an object that corresponds to an object (for example, an adjacent vehicle) other than the front vehicle.

While the transformed signals fu1$a$ and fu2$a$ of a case where the frequency modulation width is the second modulation width are present at frequencies that are relatively close to each other, the transformed signals are present at the frequencies that are separated from each other more than the frequencies of the transformed signals fu1 and fu2 of the above-described case where the frequency modulation width is the first modulation width. More specifically, in the case of the first modulation width, the transformed signal fu1 is present at 2 kHz, and the transformed signal fu2 is present at 4 kHz, whereby the two transformed signals are present at frequencies separated from each other by 2 kHz. In contrast to this, in the case of the second modulation width, the transformed signal fu1$a$ is present at 4 kHz, and the transformed signal fu2$a$ is present at 8 kHz, whereby the two transformed signals are present at frequencies separated from each other by 4 kHz. For that reason, the transformed signals fu1$a$ and fu2$a$ are derived as individual peak signals pu1$a$ and pu2$a$. In addition, the transformed signal fu3$a$ is derived as a peak signal pu3$a$.

The transformed signals fd1$a$, fd2$a$, and fd3$a$ illustrated in the lower diagram of FIG. 5 are signals exceeding the threshold th representing a predetermined signal level and are derived as peak signals. In addition, the transformed signals fd1$a$ and fd2$a$ are signals corresponding to the beat frequencies fdn1$a$ and fdn2$a$ described with reference to the lower diagram of FIG. 4, and the transformed signal fd3$a$ is a signal corresponding to a beat frequency not illustrated in the lower diagram of FIG. 4. In other words, the transformed signal fd3$a$ is a signal based on a reflected wave reflected from an object that corresponds to an object (for example, an adjacent vehicle) other than the front vehicle.

While the transformed signals fd1$a$ and fd2$a$ of a case where the frequency modulation width is the second modulation width are present at frequencies that are relatively close to each other, the transformed signals are present at the frequencies that are separated from each other more than the frequencies of the transformed signals fd1 and fd2 of the above-described case where the frequency modulation width is the first modulation width. More specifically, in the case of the first modulation width, the transformed signal fd1 is present at 10 kHz, and the transformed signal fd2 is present at 12 kHz, whereby the two transformed signals are present at frequencies separated from each other by 2 kHz. In contrast to this, the transformed signal fd1$a$ is present at 20 kHz, and the transformed signal fd2$a$ is present at 24 kHz, whereby the two transformed signals are present at frequencies separated from each other by 4 kHz. For that reason, the transformed signals fd1$a$ and fd2$a$ are derived as individual peak signals pd1$a$ and pd2$a$. In addition, the transformed signal fd3$a$ is derived as a peak signal pd3$a$.

Then, the peak signal pu1$a$ in the UP zone and the peak signal pd1$a$ in the DOWN zone, the peak signal pu2$a$ in the UP zone and the peak signal pd2$a$ in the DOWN zone, and the peak signal pu3$a$ in the UP zone and the peak signal pd3$a$ in the DOWN zone are respectively paired, whereby pair data d1$a$, pair data d2$a$, and pair data d3$a$ are derived. Based on such pair data, information such as a vertical distance and a relative speed of object data corresponding to an object is detected. In other words, information such as vertical distances and relative speeds of the rear bumper of the front vehicle, the rear glass of the front vehicle, and the adjacent vehicle is detected.

In this way, for example, in a case where the frequency modulation width is relatively narrow (for example, 200 MHz), the frequencies of transformed signals based on different reflecting points of the same object of the rear bumper of the front vehicle and the rear glass of the front vehicle are frequencies (for example, 2 kHz and 4 kHz) that are relatively close to each other, whereby one peak signal is derived even for the reflecting points different from each other. In contrast to this, in a case where the frequency modulation width is relatively wide (for example, 400 MHz), the frequencies of the transformed signals are frequencies (for example, 4 kHz and 8 kHz) that are relatively separated from each other. As a result thereof, a plurality of peak signals corresponding to the transformed signals are derived.

In this way, since a plurality of peak signals are derived from the same object, a plurality of pieces of object data are detected for the same object. Then, the same object data included in the plurality of pieces of object data is determined to have continuity with the past correspondence data of another object, whereby there is a case where vehicle control is performed based on unnecessary object data in the vehicle control such as the AGO. In order to prevent the degradation of the safety of a user using the vehicle according to such vehicle control, processes described as below are performed.

3. Process Flowchart 3-1. Object Data Output Process

Figure 6:
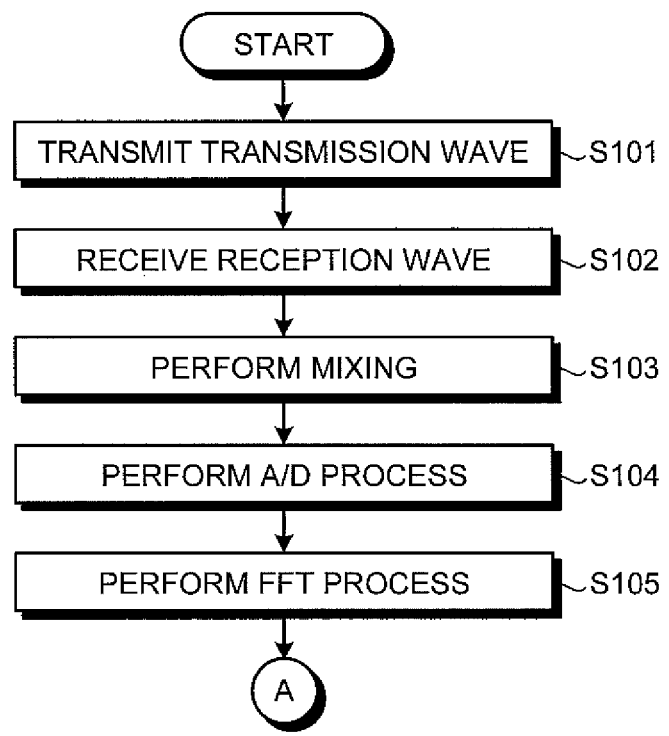
FIGS. 6 and 7 are flowcharts that illustrate an object data output process of a radar device according to the first embodiment for a vehicle control device.
Figure 7:
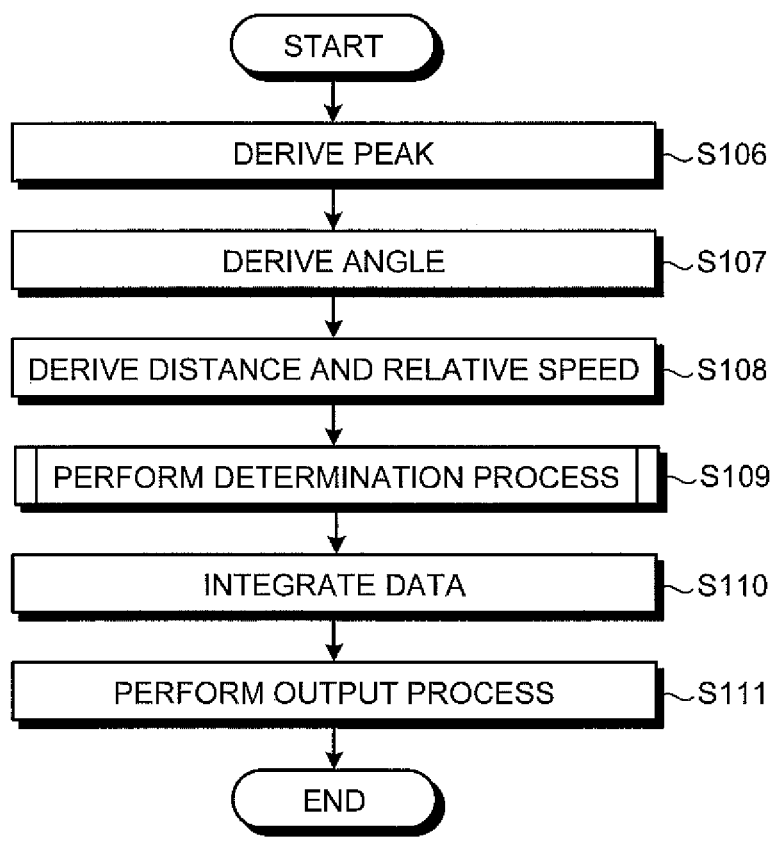

FIGS. 6 and 7 are flowcharts that illustrate an object data output process of the radar device 1 according to the first embodiment for the vehicle control device 2. In Step S101 illustrated in FIG. 6, the transmission antenna 13 outputs a transmission wave corresponding to the transmission signal output from the oscillator 12 to the outside of the vehicle, and the process proceeds to the process of Step S102.

In addition, regarding the transmission wave supplied from the transmission antenna 13, in a case where one UP zone and one DOWN zone are set as one period in the transmission signal TX (TXa) (hereinafter, for the simplification of the description, it will be referred to as a "transmission signal TX"), the transmission wave corresponding to the first period is output from one transmission antenna 13a to the outside of the vehicle, and the transmission wave corresponding to the second period is output from the transmission antenna 13b that is the other transmission antenna to the outside of the vehicle.

In Step S102, a reflected wave that comes by reflecting the transmission wave on an object is received by the reception antenna 14, and the process proceeds to the process of Step S103.

In Step S103, reception signals RX1 (RX1a) and RX2 (RX2a) (hereinafter, for the simplification of description, they will be referred to as a "reception signal RX") and a transmission signal TX corresponding to the reflecting wave received by the reception antenna 14 are mixed by the mixer 15, a beat signal that is a difference between the transmission signal TX and the reception signal RX is generated, and the process proceeds to the process of Step S104.

In Step S104, the AD converter 16 performs AD conversion of the beat signal that is an analog signal so as to be converted into digital data, and the process proceeds to the process of Step S105.

In Step S105, the signal processing unit 17 performs the FFT process for the beat signal that is digital data so as to generate a transformed signal, and the process proceeds to the process of Step S106 illustrated in FIG. 7.

In Step S106, peak signals exceeding a predetermined threshold th are derived from the transformed signal for which the FFT has been processed by the signal processing unit 17, and the process proceeds to the process of Step S107.

In Step S107, the signal processing unit 17 performs an angle calculating process based on the peak signals in each one of the UP zone and the DOWN zone, and the process proceeds to the process of Step S108. Described in more detail, the signal processing unit 17 derives the angle of an object using an algorithm of a predetermined angle deriving process. For example, the algorithm of the angle deriving process is ESPRIT (Estimation of Signal Parameters via Rotational Invariance Techniques), an eigenvalue, an eigenvector, and the like of a correlation matrix are calculated based on the information of phase differences of reception signals received by the reception antennas 14a to 14d, and an angle θup corresponding to the peak signal in the UP zone and the angle θdn corresponding to the peak signal in the DOWN zone are derived. In addition, based on the angle of each peak signal in the UP zone and the DOWN zone, the angle of the object data is derived by using Equation (3) described above.

In Step S108, the signal processing unit 17 pairs peak signals in the UP zone and the DOWN zone and derives a distance and a relative speed between the vehicle and the object based on Equations (1) and (2) described above, and the process proceeds to the process of Step S109.

Figure 8:
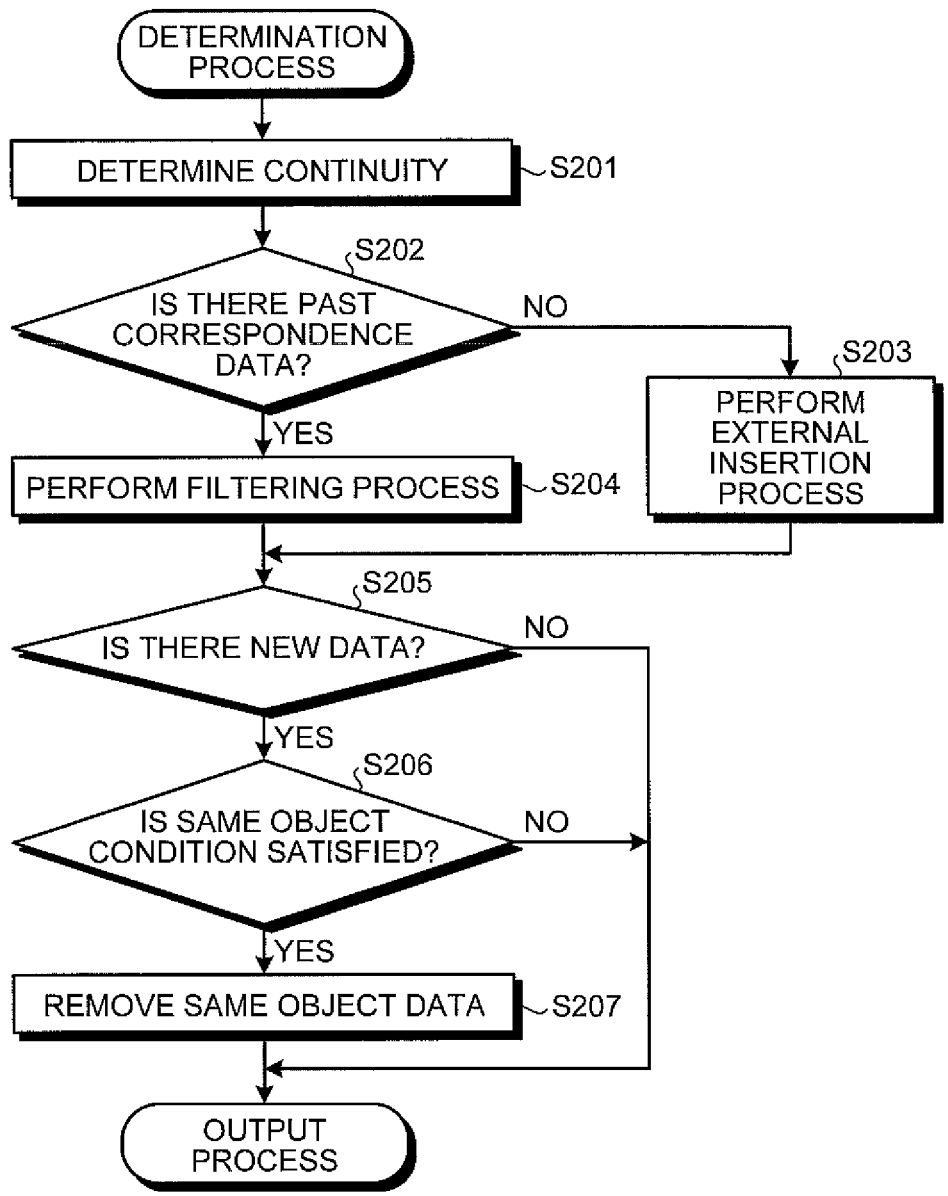
FIG. 8 is a flowchart of a determination process according to the first embodiment.

In Step S109, a determination process is performed for determining whether or not same object data is present in the plurality of pieces of pair data paired by the process of Step S108. This determination process will be described in detail with reference to the flowchart of the determination process illustrated in FIG. 8. In order to present the description of the flowchart illustrated in FIG. 8 more specifically, a data transition diagram representing a transition of data for each process illustrated in FIG. 9 will be appropriately used when the process of the flowchart illustrated in FIG. 8 is described. In the process described below, the description will be presented on the premise that the past object data is detected in a past scan.

3-2. Determination Process

In Step S201, the signal processing unit 17 performs a continuity determining process. Described in more detail, the signal processing unit 17 determines whether or not a plurality of pieces of pair data (for example, the pair data d1a, d2a, and d3a illustrated in FIG. 9) derived in this scan and the past object data d0 that is object data detected in a previous scan have time continuity, and the process proceeds to the process of Step S202.

Figure 9:
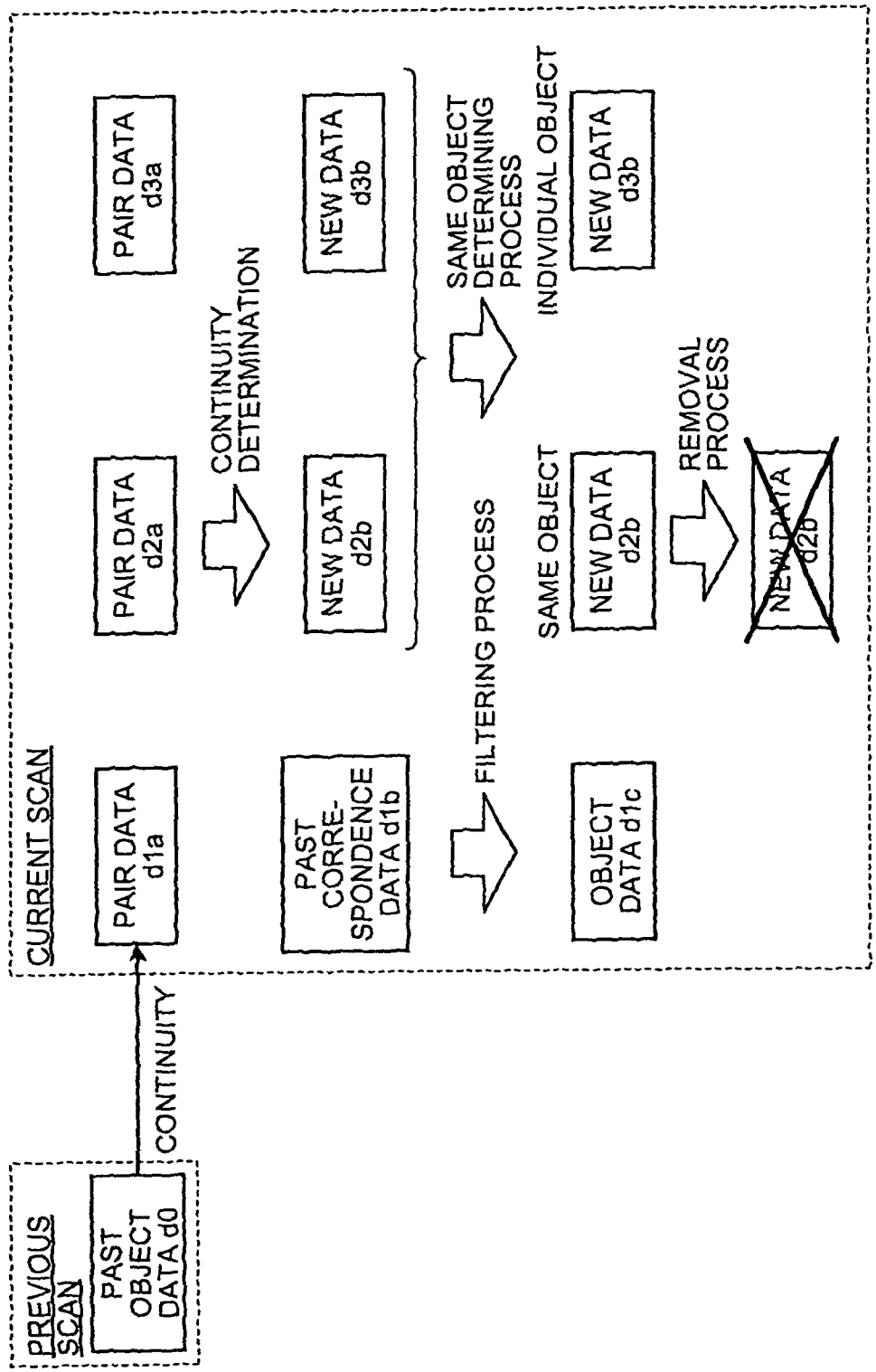
FIG. 9 is a data transition diagram that illustrates the transition of each data according to the first embodiment for each process.

In Step S202, in a case where the signal processing unit 17 determines that there is pair data having continuity with the past object data, in other words, in a case where the signal processing unit 17 determines that the past correspondence data is present (Yes in Step S202), the process proceeds to the process of Step S204. For example, as illustrated in FIG. 9, the pair data d1a is determined as past correspondence data d1b having time continuity with the past object data d0. On the other hand, in a case where the signal processing unit 17 determines that there is no pair data having continuity with the past object data in the process of Step S202, the process proceeds to the process of Step S203.

In Step S203, since pair data corresponding to the past object data has not been detected in this scan, the signal processing unit 17 performs an "external insertion process" that is a process of artificially generating pair data of this scan that corresponds to the past object data, and the process proceeds to the process of Step S205.

In Step S204, the signal processing unit 17 performs a filtering process, and the process proceeds to the process of Step S205. In this filtering process, a vertical distance, a relative speed, a vertical distance, and the like of the object data d1c of this scan illustrated in FIG. 9 are derived from information of a vertical distance, a relative speed, a horizontal distance, and the like of predicted pair data acquired by predicting pair data of this scan based on the past object data d0 and the past correspondence data d1b, and, more specifically, the following process is performed.

The signal processing unit 17 weights the distance of the predicted pair data by 0.5, weights the vertical distance of the past correspondence data d1b by 0.5, and derives a sum of both values as the vertical distance of the object data d1c. In addition, the signal processing unit 17 weights the relative speed of the predicted pair data by 0.75, weights the relative speed of the past correspondence data d1b by 0.25, and derives a sum of both values as the relative speed of the object data d1c. Furthermore, the signal processing unit 17 weights the horizontal distance of the predicted pair data by 0.5, weights the horizontal distance of the past correspondence data d1b by 0.5, and derives a sum of both values as the horizontal distance of the object data d1c. Then, the information of parameters such as the vertical distance, the relative speed, and the horizontal distance derived in this way becomes information of various parameters of the object data d1c in this scan.

In Step S205, in a case where there is new data in the plurality of pieces of pair data derived in this scan (Yes in Step S205), the signal processing unit 17 proceeds to the process of Step S206. For example, as illustrated in FIG. 9, the case is a case where the pair data d2a and the pair data d3a are determined as new data d2b and new data d3b having no time continuity with the past object data d0 as a result of the continuity determination. On the other hand, in a case where there is no new data in the plurality of pieces of pair data derived in this scan (No in Step S205), the determination process ends, and the process proceeds to an output process of Step S110.

In Step S206, the signal processing unit 17 performs a process for determining whether or not new data is object data corresponding to the same object as an object corresponding to the past correspondence data. In this process, in a case where the condition of the same object data is satisfied by the new data (Yes in Step S206), the signal processing unit 17 proceeds to the process of Step S207. In other words, in a case where values of plurality of parameters of new data, which is object data that has not been detected in a past scan, out of a plurality of pieces of object data and values of the parameters of the past correspondence data have predetermined relation, the signal processing unit 17 determines that the new data is object data corresponding to the same object as the object relating to the past correspondence data.

More specifically, in a case where a vertical distance difference between the past correspondence data and the new data satisfies the condition represented in Equation (4), and a relative speed difference between the past correspondence data and the new data and a horizontal distance difference therebetween satisfy the condition represented in Equation (5), the signal processing unit 17 determines that the new data is the object data corresponding to the same object as the object relating to the past correspondence data. In this way, unnecessary object data in the vehicle control can be accurately determined.

$$-8 \leq \text{vertical distance of past correspondence data} - \text{vertical distance of new data} \leq 8 \quad \text{Equation (4)}$$

$$\text{Horizontal distance of past correspondence data} - \text{horizontal data of new data} \leq -3.5 \times \text{relative speed of past correspondence data} - \text{relative speed of new data} + 3.5 \quad \text{Equation (5)}$$

For example, as illustrated in FIG. 9, since new data d2b satisfies the same object determining conditions represented in Equations (4) and (5), the new data d2b is determined to be the same object data. On the other hand, since new data d3b does not satisfy the same object determining conditions represented in Equations (4) and (5), the new data is determined as object data corresponding to an object other than the object relating to the past correspondence data.

In a case where new data does not satisfy the same object data conditions (No in Step S206), the signal processing unit 17 ends the determination process, and the process proceeds to the output process of Step S110.

Figure 10:
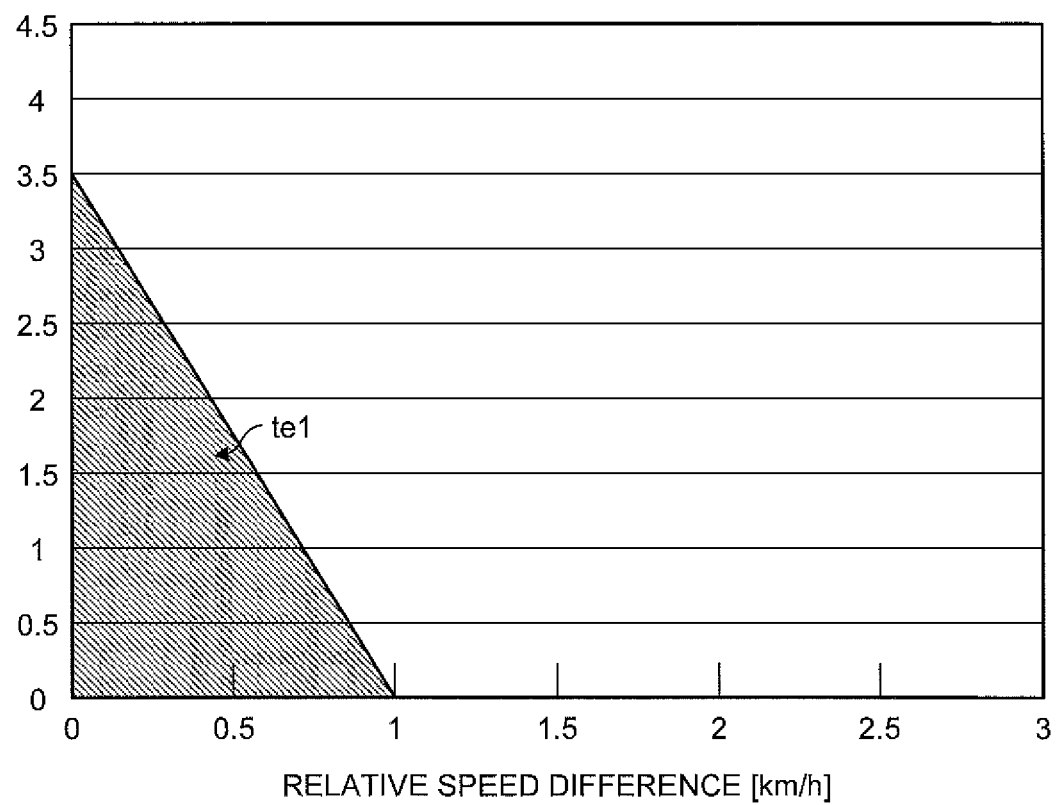
FIG. 10 is a diagram that illustrates the correlation between a relative speed difference and a horizontal distance difference between past correspondence data and new data according to the first embodiment.

Here, the correlation between the relative speed difference and the horizontal distance difference represented in Equation (5) has the same relation as a graph illustrated in FIG. 10. FIG. 10 is a diagram that illustrates the correlation between a relative speed difference and a horizontal distance difference between past correspondence data and new data according to the first embodiment. In FIG. 10, the horizontal axis represents the relative speed difference [km/h], and the vertical axis represents the horizontal distance difference [m]. The signal processing unit 17 determines whether or not new data is the same object data based on the correlation of the relative speed difference between the past correspondence data and the new data and the horizontal distance difference therebetween. In other words, the signal processing unit 17 determines whether or not new data is the same object data based on a predetermined function according to the relative speed distance and the horizontal distance difference between the past correspondence data and the new data.

Described in more detail, the signal processing unit 17 determines new data satisfying the condition represented in Equation (4) as the same object data within a determination area te1 having a segment of a linear function passing through a point of a relative speed difference of 1 km/h on the horizontal axis and a point of a horizontal distance difference of 3.5 m on the vertical axis as a boundary. In this way, unnecessary object data can be accurately determined in the vehicle control.

On the other hand, in FIG. 10, in a case where new data is outside the determination area te1, in other words, in a case where the condition of the same object data is not satisfied in Step S206 illustrated in FIG. 8, the new data is determined as object data (for example, object data of an adjacent vehicle) corresponding to an individual object other than object data relating to the same object as that of the past correspondence data.

Here, the graph representing the correlation between the relative speed difference and the horizontal distance difference illustrated in FIG. 10 is acquired as a result of detecting a plurality of pieces of object data through experiments, and, in the tendency of the values of the parameters of the relative speed difference and the horizontal distance difference of the new data determined as the same object data, the horizontal distance difference has a relatively small value in a case where the relative speed difference has a relatively large value. On the other hand, in a case where the horizontal distance difference has a relatively large value, the relative speed difference has a relatively small value.

Referring back to FIG. 8, in Step S207, in a case where the new data is determined as the same object data (Yes in Step S206) in Step S206, the signal processing unit 17 performs a process of removing the new data, which is the same object data, from the memory 172, ends the determination process, and proceeds to the output process of Step S110. In this way, vehicle control for securing user's safety can be performed without unnecessary object data being set as a control target in the vehicle control. For example, as illustrated in FIG. 9, the signal processing unit 17 performs the process of removing the new data d2b that is the same object data from the memory 172.

Referring back to FIG. 7, in Step S111, the signal processing unit 17 outputs object data, which has a high priority level, to be output to the vehicle control device 2 out of a plurality of pieces of object data to the vehicle control device 2 and ends the process. Here, the object data having a high priority level, for example, is object data having a relative speed higher than that of the other object data, object data of which the distance is shorter than that of other object data, or the like. In this way, control can be performed in which object data having a high degree of necessity for being a target for vehicle control is preferentially set as a target for the vehicle control.

5. Result of Applying Determination Process

Figure 11:
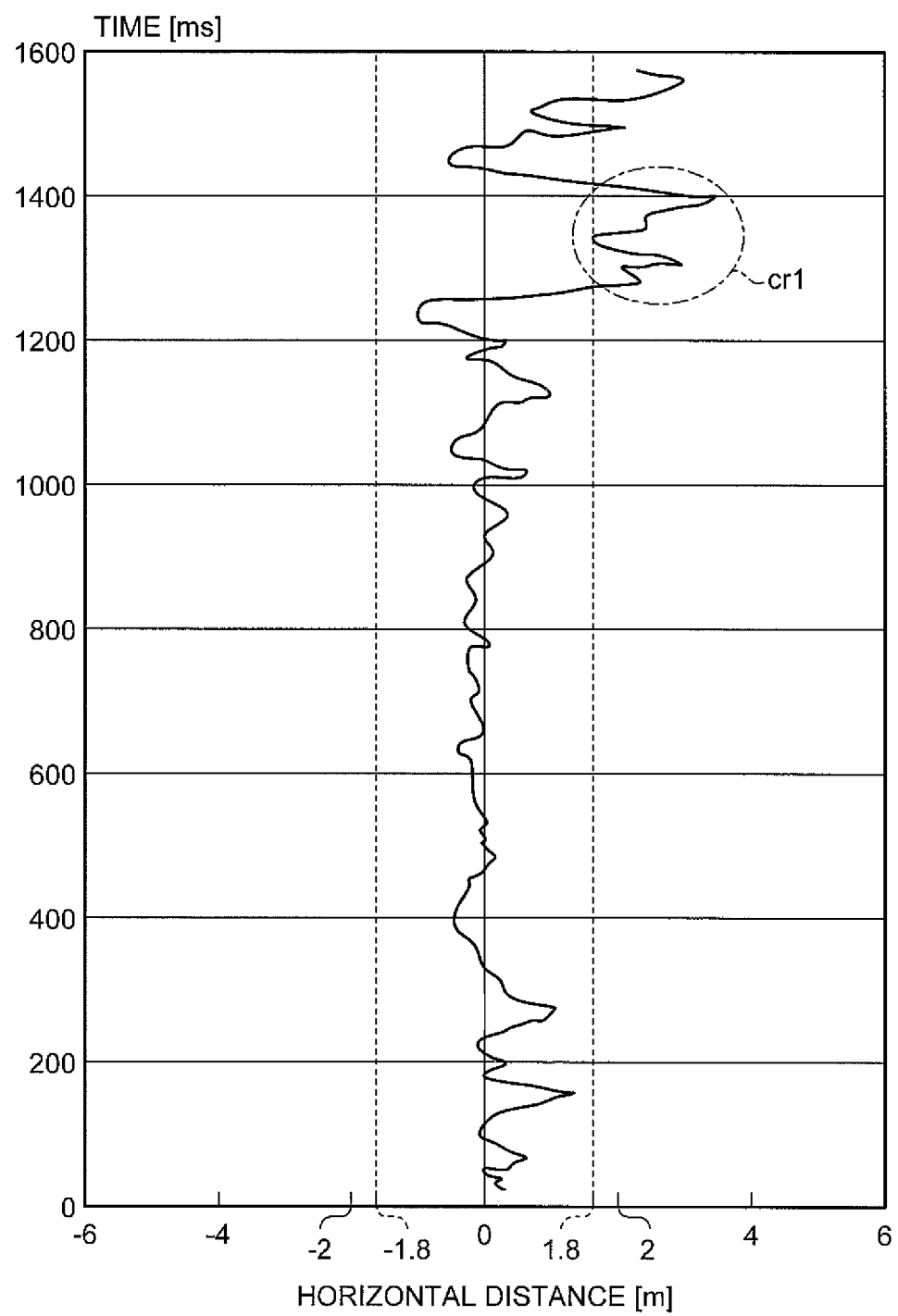
FIG. 11 is a diagram that illustrates a detection status of object data before the determination process according to the first embodiment is applied.
Figure 12:
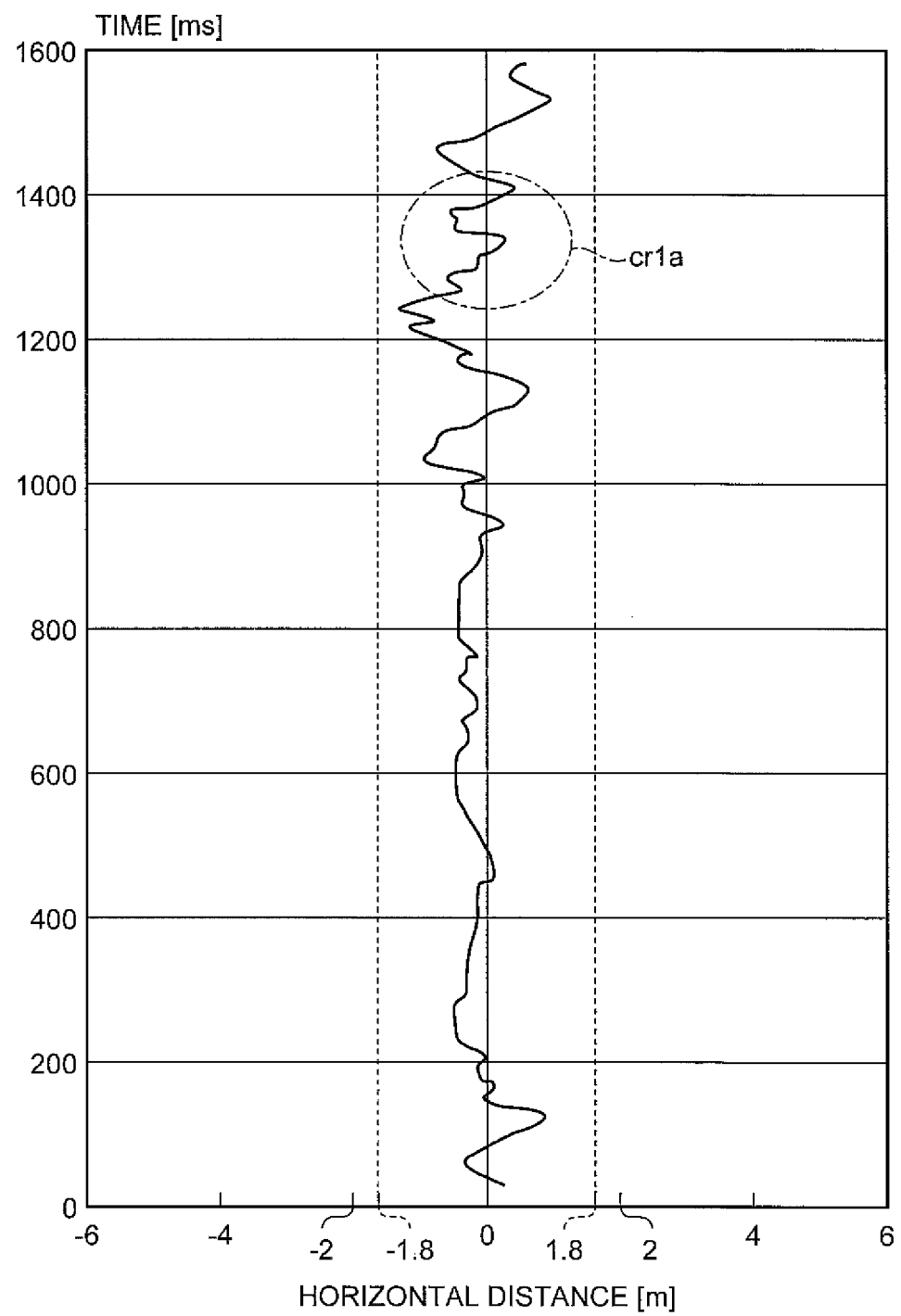
FIG. 12 is a diagram that illustrates a detection status of object data after the determination process according to the first embodiment is applied.

FIG. 11 is a diagram that illustrates a detection result of object data in the radar device 1 before the determination process according to the first embodiment is applied. In addition, FIG. 12 is a diagram that illustrates a detection result of object data in the radar device 1 according to the first embodiment after the determination process is applied. In FIGS. 11 and 12, the vertical axis represents the time [ms], and the horizontal axis represents the horizontal distance [m]. In addition, a solid line represents detection positions of object data that is set as a tracking target of the vehicle for each time in the control of the ACC. In other words, in a plurality of scans, the horizontal distance of object data determined to have time continuity as a result of the continuity determination for each time is illustrated.

A range of the horizontal distance 11.8 m from a horizontal distance of 0 m, which is denoted by a broken line, illustrates an area of a lane in which the vehicle travels, and a horizontal distance below −1.8 m or a horizontal distance above +1.8 m is a distance on which an adjacent lane is present. In FIG. 11, while an object (for example, a front vehicle) of the past correspondence data is set as the tracking target until time of about 1,250 ms, near time 1,250 ms to 1,400 ms of a range cr1 surrounded by a one-dot chain line, it is determined to have continuity with an object (for example, an adjacent vehicle) in an adjacent lane outside the lane in which the vehicle travels. The reason for this is that past correspondence data and new data are detected in the front vehicle that is the same object in the past scan, and the new data and past object data corresponding to the adjacent vehicle are determined to have continuity in this scan.

Then, the new data that has been determined to have continuity with the past object data of the adjacent vehicle is present at a vertical distance closer to the vehicle than the past correspondence data corresponding to the front vehicle, and accordingly, the tracking target is changed from the past correspondence data to the new data. In this case, there is a possibility that the vehicle performs vehicle control with the adjacent vehicle being set as the tracking target, and there is a case where the safety of a user using the vehicle is degraded.

FIG. 12 illustrates a detection result of object data after the same object data is removed by the process of Step S207 in the same object determination of Step S109 described with reference to FIG. 7. Near time 1,250 ms to 1,400 ms corresponding to a range cr1a surrounded by a one-dot chain line illustrated in FIG. 12, the front vehicle within the lane in which the vehicle travels is determined to have continuity. In other words, as the signal processing unit 17 removes new data corresponding to the same object as the object relating to the past correspondence data detected in one scan, vehicle control for securing the safety of a user using the vehicle is performed without unnecessary object data being set as control target in the vehicle control.

Second Embodiment

Next, a second embodiment will be described. While the configuration and the process of a vehicle control system 100 according to the second embodiment are almost the same as those of the first embodiment, the condition for the same object data determining process is partially different from that of the first embodiment. Accordingly, hereinafter, different points will be focused in the description.

In the first embodiment, as illustrated in FIGS. 8 to 10, the signal processing unit 17 determines whether or not new data is the same object data mainly based on the correlation between a relative speed difference and a horizontal distance difference of the past correspondence data and the new data. In the second embodiment, the process of determining the same object data is performed based on a vertical distance difference instead of the relative speed difference.

Figure 13:
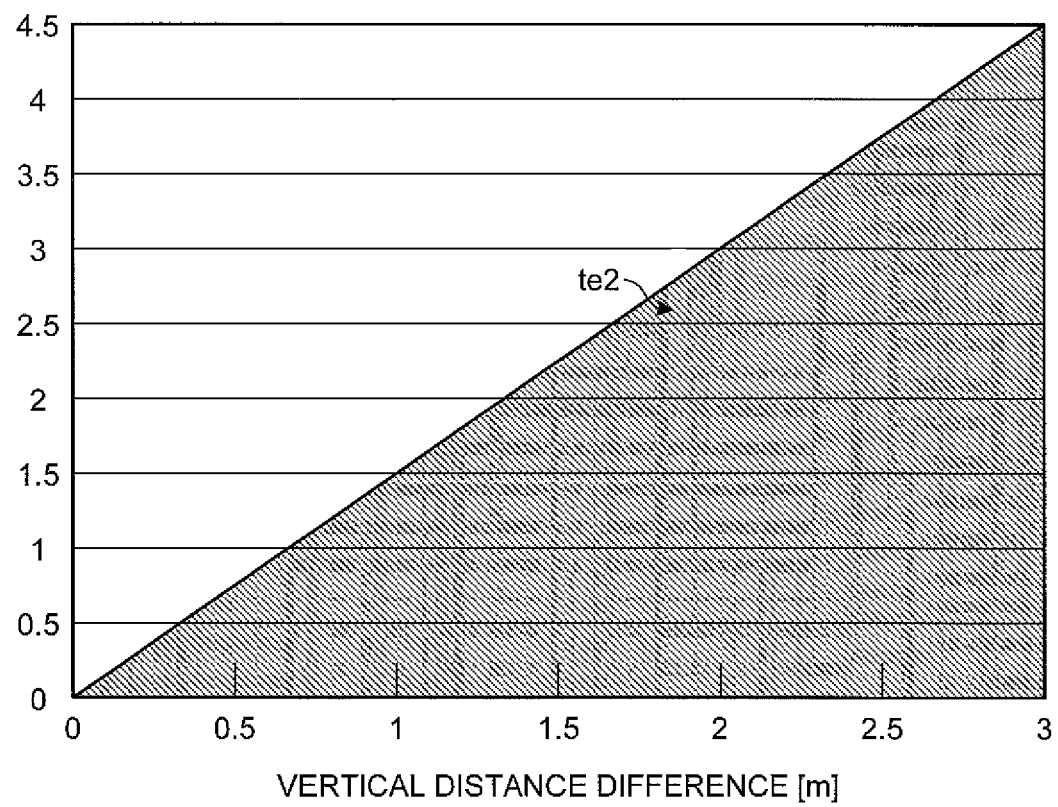
FIG. 13 is a diagram that illustrates the correlation between a vertical distance difference and a horizontal distance difference of past correspondence data and new data according to a second embodiment.

FIG. 13 is a diagram that illustrates the correlation between a vertical distance difference [m] and a horizontal distance difference [m] of past correspondence data and new data according to the second embodiment. The signal processing unit 17 determines whether or not new data is the same object data based on the correlation between a vertical distance difference and a horizontal distance difference of the past correspondence data and the new data. In other words, as illustrated in FIG. 13, the signal processing unit 17 determines new data within a determination area te2 having a segment of a linear function that passes the origin having a vertical distance difference of 0 m on the horizontal axis and a horizontal distance difference of 0 m on the vertical axis and has an inclination of about 1.5 as the boundary as the same object data. From this, unnecessary object data in the vehicle control can be accurately determined.

Here, the graph representing the correlation between the vertical distance difference and the horizontal distance difference illustrated in FIG. 13 is acquired as a result of detecting a plurality of pieces of object data through experiments, and, in the tendency of the values of the parameters of the vertical distance difference and the horizontal distance difference of the new data determined as the same object data, the horizontal distance difference has a relatively large value in a case where the vertical distance difference has a relatively large value. On the other hand, in a case where the horizontal distance difference has a relatively small value, the vertical distance difference has a relatively small value.

Modified Example

As above, while the embodiments have been described, the present invention is not limited to the above-described embodiments, and various modifications can be made therein. Hereinafter, such modified examples will be described. In addition, all the forms including the forms described in the above-described embodiments and forms to be described as below may be appropriately combined.

In the above-described embodiments, although the removal of the same object data has been described, as another process, a process of combining the past correspondence data and the same object data corresponding to the same object as one piece of data may be performed in a case where the same object data is detected.

In addition, in the above-described embodiments, the process of determining new data having relation with new data satisfying the conditions of Equations (4) and (5) described above as the same object data based on the past correspondence data has been described. In contrast to this, in a case where the new data having a relation with another piece of new data satisfies the conditions of Equations (4) and (5) described above based on one piece of new data, new data having a larger value of the vertical distance from the vehicle may be determined as the same object data, and the process of removing the data may be performed.

In addition, in the above-described embodiments, although the segments that form the boundaries of the determination areas te1 and te2 of the conditions for determining the same object data have been described to be in correspondence with a linear function, the function is not necessarily needed to be a linear function, but any other function (for example, a quadratic function, a cubic function, or the like) may be used.

Furthermore, in the above-described embodiments, the angle deriving process of the radar device 1 has been described as a process according to the algorithm of the ESPRIT. However, the angle deriving may be performed by using the other algorithms as follows. More specifically, any one algorithm of DBF (Digital Beam Forming), a PRISM (Propagator method based on an Improved Spatial-smoothing Matrix), MUSIC (Multiple Signal Classification) and the like may be used.

In addition, in the above-described embodiments, the radar device 1 may be used for various uses other than for being mounted in a vehicle (for example, at least one of monitoring an airplane during a flight or monitoring a ship during sailing).

Furthermore, in the above-described embodiments, although it has been described that there are two transmission antennas and four reception antennas, the number of antennas may be other than that, and, for example, it may be configured such that there are one transmission antenna and five reception antennas.

In addition, in the above-described embodiments, in the radar device 1, although the reception antenna 14 and the transmission antenna 13 are independently arranged, the reception antenna may also serve as the transmission antenna. In such a case, immediately after transmitting a transmission wave, each antenna is changed to be in a reception state and can receive a reflected wave that is acquired by reflecting the transmission wave on an object.

As described above, the radar device according to an embodiment includes a transmission unit, a reception unit, a processing unit, a first determination unit, and a second determination unit. The transmission unit emits a transmission wave according to a frequency-modulated transmission signal. The reception unit receives a reflected wave coming by reflecting the transmission wave on an object as a reception signal. The processing unit detects object data corresponding to the object from the reception signal. The first determination unit determines object data included in a predicted range based on past object data detected in a past scan from among a plurality of pieces of object data detected in one scan as past correspondence data having time continuity with respect to the past object data. In a case where values of a plurality of parameters of new data that is object data that has not been detected in the past scan out of the plurality of pieces of object data and values of a plurality of parameters of the past correspondence data have predetermined relation, the second determination unit determines the new data as object data corresponding to the same object as the object relating to the past correspondence data.

In addition, the radar device according to an embodiment further includes a removal unit that removes the new data in a case where the new data is determined as object data corresponding to the same object as the object relating to the past correspondence data.

Furthermore, in the radar device according to an embodiment, the predetermined relation is relation that is based on a predetermined function according to at least relative speed difference and a horizontal distance difference between the past correspondence data and the new data.

In addition, a method of processing a signal according to an embodiment includes: emitting a transmission wave relating to a frequency-modulated transmission signal; receiving a reflected wave coming by reflecting the transmission wave on an object as a reception signal; detecting object data corresponding to the object from the reception signal; (a) determining object data included in a predicted range based on past object data detected in a past scan out of a plurality of pieces of object data detected in one scan as past correspondence data having time continuity with the past object data; and (b) determining new data as the object data corresponding to a same object as an object relating to the past correspondence data in a case where values of a plurality of parameters of the new data that is the object data not detected in the past scan and values of a plurality of parameters of the past correspondence data have predetermined relation from among the plurality of pieces of object data.

According to the radar device and the method of processing a signal according to an embodiment, by determining whether or not new data is new data corresponding to the same object as an object relating to the past correspondence data, unnecessary object data in vehicle control can be accurately determined.

In addition, according to the radar device and the method of processing a signal according to an embodiment, by removing new data determined as object data corresponding to the same object as an object relating to the past correspondence data, vehicle control can be performed in which the safety of a user using the vehicle is secured without setting unnecessary object data as a control target in the vehicle control.

Furthermore, according to the radar device and the method of processing a signal according to an embodiment, by setting predetermined relation as relation that is based on a predetermined function according to a relative speed difference and a horizontal distance difference between the past correspondence data and new data, unnecessary object data in the vehicle control can be accurately determined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A radar device comprising:
a transmission unit that emits a transmission wave relating to a frequency-modulated transmission signal;
a reception unit that receives, as a reception signal, a reflected wave acquired by reflection of the transmission wave off of an object; and
a processor programmed to:
perform a first scanning that includes emitting, by the transmission unit, a first transmission wave, receiving, by the reception unit, one or more first reflected waves, and detecting, in the first reflected waves, a first plurality of pieces of object data;
perform a second scanning that includes emitting, by the transmission unit, a second transmission wave, receiving, by the reception unit, one or more second reflected waves, and detecting, in the second reflected waves, a second plurality of pieces of object data;
determine whether a first object among the first plurality of pieces of object data corresponds to a second object among the first plurality of pieces of object data; and if the first object corresponds to the second object:
  determine a correlation between the first object and the second object; and
  remove, based on the correlation between the first object and the second object, one of the second plurality of pieces of object data.

2. The radar device according to claim 1, wherein the determined correlation is a relation that is based on a predetermined function according to at least the relative speed difference and the horizontal distance difference between a same object that corresponds to each of the first and second objects in the first plurality of pieces of object data and an object corresponding to the same object in the second plurality of pieces of object data.

3. The radar device according to claim 1, wherein the determined correlation is a relation that is based on a predetermined function according to at least the relative speed difference between a same object that corresponds to each of the first and second objects in the first plurality of pieces of object data and an object corresponding to the same object in the second plurality of pieces of object data.

4. A method comprising:
performing a first scanning that includes emitting a first transmission wave, receiving one or more first reflected waves, and detecting, in the first reflected waves, a first plurality of pieces of object data;
performing a second scanning that includes emitting a second transmission wave, receiving one or more second reflected waves, and detecting, in the second reflected waves, a second plurality of pieces of object data;
determining whether a first object among the first plurality of pieces of object data corresponds to a second object among the first plurality of pieces of object data; and
if the first of corresponds to the second object:
  determining a correlation between the first object and the second object; and
  removing, based on the correlation between the first object and the second object, one of the second plurality of pieces of object data.

5. The method according to claim 4, wherein the determined correlation is a relation that is based on a predetermined function according to at least the relative speed difference and the horizontal distance difference between a same object that corresponds to each of the first and second Objects in the first plurality of pieces of object data and an object corresponding to the same object in the second plurality of pieces of object data.

6. A non-transitory computer-readable medium comprising computer-executable instructions that, when executed by a processor, cause the processor to:
perform a first scanning that includes controlling a transmission unit to emit a first transmission wave, controlling a reception unit to receive first reflected waves, and detecting, in the first reflected waves, a plurality of pieces of object data;
perform a second scanning that includes controlling the transmission unit to emit a second transmission wave, controlling the reception unit to receive second reflected waves, and detecting, in the second reflected waves, a second plurality of pieces of object data;
determine whether a first object among the first plurality of pieces of object data corresponds to a second object among the first plurality of pieces of object data; and
if the first object corresponds to the second object:
  determine a correlation between the first object and the second object; and
  remove, based on the correlation between the first object and the second object, one of the second plurality of pieces of object data.

7. The non-transitory computer-readable medium according to claim 6, wherein the determined correlation is a relation that is based on a predetermined function according to at least the relative speed difference and the horizontal distance difference between a same object that corresponds to each of the first and second objects in the first plurality of pieces of object data and an object corresponding to the same object in the second plurality of pieces of object data.

8. The radar device according to claim 1, wherein the determination of whether the first object among the first plurality of pieces of object data corresponds to the second object among the first plurality of pieces of object data includes pairing a peak signal of the UP zone and a peak signal of the DOWN zone, respectively, in the first and second reflected waves, respectively, with each other.

9. The method according to claim 4, wherein the determination of whether the first object among the first plurality of pieces of object data corresponds to the second object among the first plurality of pieces of object data includes pairing a peak signal of the UP zone and a peak signal of the DOWN zone, respectively, in the first and second reflected waves, respectively, with each other.

10. The non-transitory computer-readable medium according to claim 6, wherein the determination of whether the first object among the first plurality of pieces of object data corresponds to the second object among the first plurality of pieces of object data includes pairing a peak signal of the UP zone and a peak signal of the DOWN zone, respectively, in the first and second reflected waves, respectively, with each other.

11. The radar device according to claim 1, wherein the first object and the second object are mutually-different reflecting points of a same tracking target.

12. The method according to claim 4, wherein the first object and the second object are mutually-different reflecting points of a same tracking target.

13. The non-transitory computer-readable medium according to claim 6, the first object and the second object are mutually-different reflecting points of a same tracking target.

* * * * *